(12) United States Patent
Dong et al.

(10) Patent No.: US 8,358,806 B2
(45) Date of Patent: Jan. 22, 2013

(54) FAST CROWD SEGMENTATION USING SHAPE INDEXING

(75) Inventors: Lan Dong, Shanghai (CN); Vasudev Parameswaran, Dayton, NJ (US); Visvanathan Ramesh, Plainsboro, NJ (US); Imad Zoghlami, Issaquah, WA (US)

(73) Assignee: Siemens Corporation, Iselin, NJ (US)

( * ) Notice: Subject to any disclaimer, the term of this patent is extended or adjusted under 35 U.S.C. 154(b) by 998 days.

(21) Appl. No.: 12/184,685

(22) Filed: Aug. 1, 2008

(65) Prior Publication Data

US 2009/0034793 A1    Feb. 5, 2009

Related U.S. Application Data

(60) Provisional application No. 60/953,573, filed on Aug. 2, 2007.

(51) Int. Cl.
*G06K 9/00* (2006.01)
(52) U.S. Cl. ............ 382/103; 382/173; 382/218
(58) Field of Classification Search ........... 382/103, 382/173, 218
See application file for complete search history.

(56) References Cited

U.S. PATENT DOCUMENTS

2005/0018045 A1* 1/2005 Thomas et al. ............. 348/157
2007/0003141 A1* 1/2007 Rittscher et al. ............ 382/181

OTHER PUBLICATIONS

Kale et al., "Identification of Humans Using Gait", 2004, IEEE Trans. on Image Processing, vol. 13, No. 9, 1163-1173.*
Preteux et al., "Model-Based Head Tracking and 3D Pose Estimation", 1998, SPIE Proceedings vol. 3457, 94-108.*
Sand et al., "Video Matching", 2004, ACM , 592-599.*
Yam et al., "On the Relationship of Human Walking and Running: Automatic Person Identification by Gait", 2002, IEEE, 287-290.*
Zhao et al., "Bayesian Human Segmentation in Crowded Situations", 2003, IEEE.*
Stauffer et al., "Adaptive background mixture models for real-time tracking", 1999, IEEE, 246-252.*

* cited by examiner

*Primary Examiner* — Claire X Wang
*Assistant Examiner* — Katrina Fujita (57) ABSTRACT

A method for performing crowd segmentation includes receiving video image data (S21). Background differencing is performed on the received video image data to identify a foreground silhouette shape (S22). Approximate number and position of human subjects within the received video image data are determined by matching the foreground silhouette shape against a set of predetermined foreground silhouette shapes, for each of which a number and position of human subjects is known (S28). The estimated number and position of the human subjects is refined to determine a final number and position of the human subjects (S27).

23 Claims, 9 Drawing Sheets

FAST CROWD SEGMENTATION USING SHAPE INDEXING

CROSS-REFERENCE TO RELATED APPLICATION

The present application is based on provisional application Ser. No. 60/953,573, filed Aug. 2, 2007, the entire contents of which are herein incorporated by reference.

BACKGROUND OF THE INVENTION

1. Technical Field

The present disclosure relates to crowd segmentation and, more specifically, to fast crowd segmentation using shape indexing.

2. Discussion of Related Art

The detection, localization and tracking of human subjects within a video stream have many practical applications. For example, detection, localization and tracking may be used to design an intuitive computer interface in which users can control a computer system with their movements. Additionally, in the field of security and surveillance, it is particularly useful to know how many human subjects appear in the video and where they are located.

Detection, localization and tracking of an isolated individual generally does not pose a particular challenge for computer vision systems; however, when the video stream includes multiple people in close proximity where people can partially occlude each other, detection, localization and tracking can become particularly difficult. Techniques have been developed for isolating individuals from within a group, and these techniques have been known as "crowd segmentation."

Conventional approaches to crowd segmentation may be grouped into three categories. The first category includes appearance-based approaches. These approaches may involve the use of "head detection," where the video image data stream is inspected for the occurrence of the "Ω" shape that is generally associated with the contour of a person's head and shoulder. However, when using this approach, the head cannot always be reliably detected across different viewing angles and far distances. Accordingly, head detection techniques alone are often insufficient to accurately segment a crowd. Other appearance-based approaches may use learned local appearance descriptors. For example, B. Leibe, E. Seemann, and B. Schiele, *Pedestrian Detection in Crowded Scenes, Proc. IEEE Conf. on Computer Vision and Pattern Recognition*, pages 878-885, 2005, relates to an interest-point and local feature descriptor-based detector, followed by global grouping constraints, used to detect humans.

B. Wu and R. Nevatia, *Detection of Multiple, Partially Occluded Humans in a Single Image by Bayesian Combination of Edgelet Part Detectors, Proc. Intl. Conference on Computer Vision*, 1:90-97, 2005, relates to a parts-based human detector that is extended to handle multiple humans. Such approaches of the related art are complex, computation intensive, and may also be ineffective when used for arbitrary surveillance situations.

Grouping based approaches typically use motion features to isolate tracks of people, and infer their positions in frames. For example, V. Rabaud and S. Belongie, *Counting Crowded Moving Objects, Pro. Ieee Conf on Computer Vision and Pattern Recognition*, 1:705-711, 2006; and G. Brostow and R. Cipolla, *Unsupervised Bayesian Detection of Independent Motion in Crowds, Proc. IEEE Conf on Computer Vision and Pattern Recognition*, 1:594-601, 206, relate to the use of clustering in space and time, trajectories over several frames for coherence. This method is used to count moving objects in dense crowds but is not satisfactory for localization.

Generative model based parameter optimization approaches model the image formation process as parameterized by the attributes of humans in the scene. The parameter set that best explains the observed image may then be identified.

J. Rittscher, P. Tu, and N. Krahnstover, *Simultaneous Estimation of Segmentation and Shape, Proc. IEEE Conf on Computer Vision and Pattern Recognition*, 2:486-493, 2005, relates to partitioning a given set of image features using a likelihood function that is parameterized on the shape and location of potential individuals in the scene. This approach uses a variant of the Expectation Maximization algorithm to perform global annealing based optimization and finds maximum likelihood estimates of the model parameters and the grouping.

In A. E. Elgammal and L. S. Davis, *Probabilistic Framework for Segmenting People Under Occlusion, Proc. IEEE Intl. Conf on Computer Vision*, 2:145-152, 2001, humans are assumed to be isolated as they enter the scene so that a human specific color model can be initialized for segmentation when occlusion occurs later. One particular problem with this approach is that the initial assumption is not necessarily valid in crowded situations.

In M. Isard and J. MacCormick, *Bramble: A Bayesian Multiple-Blob Tracker, Proc. IEEE Intl. Conf on Computer Vision*, 2:34-41, 2001, a generalized cylinder based representation is used to model humans and their appearance. The number and positions of the humans are then tracked using a particle filter.

T. Zhao and R. Nevatia, *Bayesian Human Segmentation in Crowded Situations, Proc. IEEE Conf. on Computer Vision and Pattern Recognition*, 2:12-20, 2003, relates to a generative process where parameters including the number of people, their location and their shape are used to track individuals. This technique uses Markov Chain Monte Carlo (MCMC) to achieve global optimization by searching for maximum likelihood estimates for the model parameters. These approaches may be complicated and may involve the use of a high dimensional parameter space. Accordingly, the process for searching for the best parameters may be particularly slow.

Accordingly, the most effective techniques of the related art are highly complex and may thus require the use of costly hardware and/or may not be fast enough to perform detection, localization and tracking of individual human subjects within a crowd from a video stream in real-time.

SUMMARY

Exemplary embodiments of the present invention introduce the idea of performing crowd segmentation using an indexing step which produces a quick, approximate result, followed, where desired, by an estimation step which further refines the approximate result. Exemplary embodiments of the invention use shape matching and novel example-based approaches for performing the indexing step and a known Markov Chain Monte Carlo method for the estimation step. Such approaches may provide for real-time operation. The shape of a foreground blob may be seen as encoding a lot of information about the number and positions of humans in a group that is perceived as the foreground blob. Fourier descriptors may be used for representing a shape. An indexing function may be used to map the observed descriptors to candidate parameter sets representing the shape of the foreground blob. Locally weighted regression may be used to calculate the best parameter set. Articulations and errors introduced in the foreground generation process may be dealt with using morphological filtering operations while the inherent ambiguity involved in the mapping process may be dealt with using dynamic fast estimation of the parameter set for low to moderate number of people in a single blob and may provide initial guesses for a search based algorithm should the returned error be large to reduce the time necessary to achieve convergence.

These approaches may be self-diagnosing and may identify when data is out of its range of operation, so that a more complex search based approach can then be invoked.

A method for performing crowd segmentation includes receiving video image data. Background differencing is performed on the received video image data to identify a foreground silhouette shape. Approximate number and position of human subjects within the received video image data are determined by matching the foreground silhouette shape against a set of predetermined foreground silhouette shapes, for each of which a number and position of human subjects is known. The estimated number and position of the human subjects is refined to determine a final number and position of the human subjects.

A method for performing crowd segmentation includes receiving video image data. Background differencing is performed on the received video image data to identify a foreground silhouettes shape. The foreground silhouettes shape is represented as a representative shape descriptor. The representative shape descriptor is matched against a set of predetermined shape descriptors, for each of which a number and position of human subjects is known, to find at least one closest predetermined shape descriptors. Approximate number and position of human subjects within the received video image data is determined based on the known number and position of human subjects from the one or more closest predetermined shape descriptors.

The received video image data may include a series of image frames captured from a stationary video camera. The background differencing may be performed on the received video image data by applying any appropriate (e.g. Stauffer Grimson) algorithm to the received video image data.

Representing the foreground silhouettes shape as a representative shape descriptor may include sampling the perimeter of the foreground silhouette shape to obtain a set of sample points, transforming the set of sample points into the frequency domain by performing a discrete Fourier transform, selecting a set of desired Fourier descriptor coefficients from the set of sample points in the frequency domain, and forming the shape descriptor based on the selected set of desired Fourier descriptor coefficients.

The perimeter of the foreground silhouette shape may be sampled at regular intervals. Selecting the set of desired Fourier descriptor coefficients may include selecting a set of low frequency Fourier descriptor coefficients. Selecting the set of desired Fourier descriptor coefficients from the set of sample points in the frequency domain may include setting a first Fourier descriptor coefficient to zero to achieve position invariance.

The representative shape descriptor may be position invariant. Matching the representative shape descriptor against the set of predetermined shape descriptors may include consulting a look-up table. Determining approximate number and position of human subjects within the received video image data based on the known number and position of human subjects from the one or more closest predetermined shape descriptors may include interpolating the known number and position of human subjects from the one or more closest predetermined shape descriptors based on the relationship between the representative shape descriptor and the closest predetermined shape descriptors.

Prior to matching the representative shape descriptor against a set of predetermined shape descriptors, it may be determined whether the foreground silhouettes shape is amenable to shape matching-based crowd segmentation. The foreground silhouettes shape may be filtered prior to performance of the matching step to increase matching accuracy.

A method for performing crowd segmentation includes receiving video image data. Background differencing is performed on the received video image data to identify a foreground silhouettes shape. The foreground silhouettes shape is filtered. The filtered foreground silhouettes shape is matched against a set of known foreground silhouettes shapes, for each of which a number and position of human subjects is known, to find at least one closest known foreground silhouettes shape. Approximate number and position of human subjects within the received video image data is determined based on the known number and position of human subjects from the one or more closest known foreground silhouettes shapes.

Filtering the foreground silhouettes shape may include expressing the foreground silhouettes shape in the frequency domain and removing a high-frequency component from the frequency domain expression of the foreground silhouettes shape. Filtering may be performed using a discrete Fourier transform. Matching the filtered foreground silhouettes shape against the set of known foreground silhouettes shapes may include consulting a look-up table.

A computer system includes a processor; and a program storage device readable by the computer system, embodying a program of instructions executable by the processor to perform method steps for performing crowd segmentation. The method includes receiving video image data. Background differencing is performed on the received video image data to identify a foreground silhouettes shape. The perimeter of the foreground silhouette shape is sampled to obtain a set of sample points. The set of sample points is transformed into the frequency domain by performing a discrete Fourier transform. A set of desired Fourier descriptor coefficients is selected from the set of sample points in the frequency domain. A representative shape descriptor is formed based on the selected set of desired Fourier descriptor coefficients. The representative shape descriptor is matched against a set of predetermined shape descriptors, for each of which a number and position of human subjects is known, to find at least one closest predetermined shape descriptors. Approximate number and position of human subjects within the received video image data are determined based on the known number and position of human subjects from the one or more closest predetermined shape descriptors.

The perimeter of the foreground silhouette shape may be sampled at regular intervals. Selecting the set of desired Fourier descriptor coefficients may include selecting a set of low frequency Fourier descriptor coefficients. Selecting the set of desired Fourier descriptor coefficients from the set of sample points in the frequency domain may include setting a first Fourier descriptor coefficient to zero to achieve position invariance.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to a fast, accurate, and novel approach for the real-time detection, localization and tracking of individual human subjects within a crowd from a video stream. Embodiments may be described herein with reference to a single camera with fixed orientation; however, those skilled in the art will understand how the disclosure may be modified to provide for multiple cameras and/or video capture from multiple orientations.

Exemplary embodiments of the present invention may begin with a video stream, for example, a data stream including a sequence of two-dimensional image frames. The video stream may be captured using a stationary video camera. The video camera may be a digital video camera or the video camera may be an analog video camera, the video signal of which is then digitized. In either case, the digital data stream may be binarized such that the background is identified and differentiated from the foreground.

The video signal may be acquired from a single video camera, and thus, inter-human occlusion may be significant where multiple people are traveling in a group. In this case, segmentation may be especially challenging firstly because the state space formed by the number, positions, and articulations of people is large. Secondly, in spite of many advances in background maintenance and change detection, background differencing, or binarization, remains a noisy and imprecise process, and its output may be far from ideal. Holes, fill-ins, irregular boundaries etc. pose additional challenges for the "midlevel" problem of segmenting the binarized image to localize humans.

Exemplary embodiments of the present invention may provide a novel example-based approach in which the global shape features of the binarized image are mapped by Fourier descriptors to various configurations of humans directly. Locally weighted averaging may be used to interpolate for the best possible candidate configuration. The inherent ambiguity resulting from the lack of depth and layer information in the binarized background-differentiated images may be mitigated by the use of dynamic programming, which finds the trajectory in state space that best explains the evolution of the projected shapes.

After background differencing has been performed on each frame of the video image data, the silhouettes of humans may appear as foreground shapes without depth or layer information. Multiple occluded subjects within a crowd may thus appear as a single blob. Exemplary embodiments of the present invention analyze the foreground blob produced by the occlusion of multiple human subjects to estimate the number of people and their positions in the blob.

However, despite the reduction in image data achieved by flattening the foreground image into a monochromatic blob, the size and shape of the blobs may still be highly indicative of the number of humans present in the group and their positions. Exemplary embodiments of the present invention may build an indexing function that maps a suitable representation of the blob shape into the number and position of humans (for example, the parameter set) that generated the shape. Thus, the crowd segmentation problem may be viewed as a shape matching problem. Specifically, mappings may be learned between a shape descriptor space and the space of parameters generating the shapes (such as the number of people and their locations), and stored in a look-up table. This avoids expensive searches and returns a rough estimate of candidate parameter sets.

Moreover, locally weighted regression (LWR) over the candidate parameter sets may be used to quickly estimate the shape descriptor that best explains the observed shape. Also, when a stream of images is available, dynamic programming may be used to remove inherent ambiguities due to the lack of depth and layering information in the foreground blobs and to further refine the estimate.

This indexed look-up of the parameter set may provide a quick and effective initial estimation of the number and location of people within the video stream. Where desired, these results may be augmented with the searching techniques known in the related art. Accordingly, video streams may be analyzed in real-time using relatively simple and inexpensive computing hardware The disclosure is primarily focused on the real-time shape-based matching of video stream data with the indexed look-up table. It is understood that one of ordinary skill in the art could apply these approaches to approaches within the related art to form a full-fledged integrated system.

Example-Based Estimation Framework

As exemplary embodiments of the present invention seek to estimate the number and location of people found within a video data stream, $\theta$ may be defined as the set of humans and their positions in a given foreground blob. Here, $\theta=\{n, b_1, \ldots b_n\}$ where n is number of people and $\{b_i, i=1, \ldots, n\}$ are the relative spatial positions for the humans. This set generates an image feature vector x. Here, the image feature vector $x=f(\theta)$, where f may be fairly complex. For the particular problem of segmentation of humans in crowds, $\theta$ may be recovered from x. Accordingly, $\theta=f^{-1}(x)$, and thus the number and location of all humans within the video image ($\theta$) may be extracted from the image feature vector x using the inverse generative function $f^{-1}(x)$.

However, it is not necessary that the inverse generative function $f^{-1}(x)$ be explicitly determined. Instead, parameter values for the received video data may be estimated from known values for similar examples. A training set of labeled examples $(x_1, \theta_1), \ldots, (x_N, \theta_N)$ may be stored. The training examples may be fairly dense throughout the parameter space so that for novel input there may be at least one example close to it. Accordingly, the residual may then be minimized in terms of the distance, $d_\theta$, in parameter space.

Assuming sufficient sampling density, the residual may be minimized by minimizing the distance $d_x$ in the feature space between the instant data and similar prior results. Accordingly, an example-based approach may be used to match the estimated parameters of the image feature vector to identify an approximation for $\theta$ and thus fast crowd segmentation may be performed.

Techniques for background estimation and change detection are fairly known in the art of visual surveillance. A number of sophisticated algorithms exist to compensate for various extraneous effects such as flickering, lighting changes, weather, motion etc., and the change detection process is typically insensitive to variations in surfaces due to color and texture. However, in these known techniques, effects such as strong reflections, shadows, and regions where foreground and back ground have similar colors, may cause perturbations in the final background differencing output data. These techniques typically return distance images which can be thresholded for acceptable false alarm rates to yield binary images depicting changes as blobs.

These blobs represent the foreground image which is comprised of the silhouette of a group of humans. Exemplary embodiments of the present invention utilize this silhouette to determine information about the number and positions of people in it. The silhouette blob may then be abstracted to facilitate comparison with previously collected learning data. Multiple approaches to abstracting the silhouette shape may be used, for example, the silhouette blob may be represented in terms of shape contexts or Fourier descriptors, etc. Exemplary embodiments may be described herein with reference to the use of Fourier descriptors to abstractly represent the silhouette blobs, however, it is to be understood that other methods of abstraction may be used in place of or in addition to Fourier descriptors.

Fourier descriptors may be used to allow the shape to be represented to a desired level of detail by filtering the image data, providing a compact representation, and allowing for fast computation. Any number of Fourier coefficients may be used to represent the silhouette shape. The greater the number of Fourier coefficients used, the greater the accuracy of representation and the more complex the calculations are. Accordingly, the number of Fourier coefficients used may be selected to gain sufficient representative detail while allowing for computations to be performed quickly. Exemplary embodiments of the present invention may utilize seven (7) Fourier coefficients to represent the silhouette shape, although it is contemplated that between 4 and 10 Fourier coefficients may be used, and it may also be possible to use less than 4 or greater than 10 Fourier coefficients, as dictated by the computational needs and available computing resources.

According to this approach for representing the silhouette shape in terms of Fourier descriptors, the silhouette may be sampled using a fixed number of points M: $\{(x_1, y_1), \ldots, (x_M, y_M)\}$ along the external boundary of the shape. Equidistant sampling may be used to provide a uniform sampling; however, other sampling patterns may be used as well. The sample points may then be transformed into complex coordinates $\{z_1, \ldots, z_M\}$ with $z_j = x_j + iy_j$ where $i^2 = -1$ and may be further transformed to the frequency domain using a Discrete Fourier Transform (DFT). The result may be a Fourier coefficients $F = [F^{(1)}, \ldots, F^{(M)}]$, which are complex numbers. These coefficients may then be used as descriptors of the silhouette.

Figure 1:
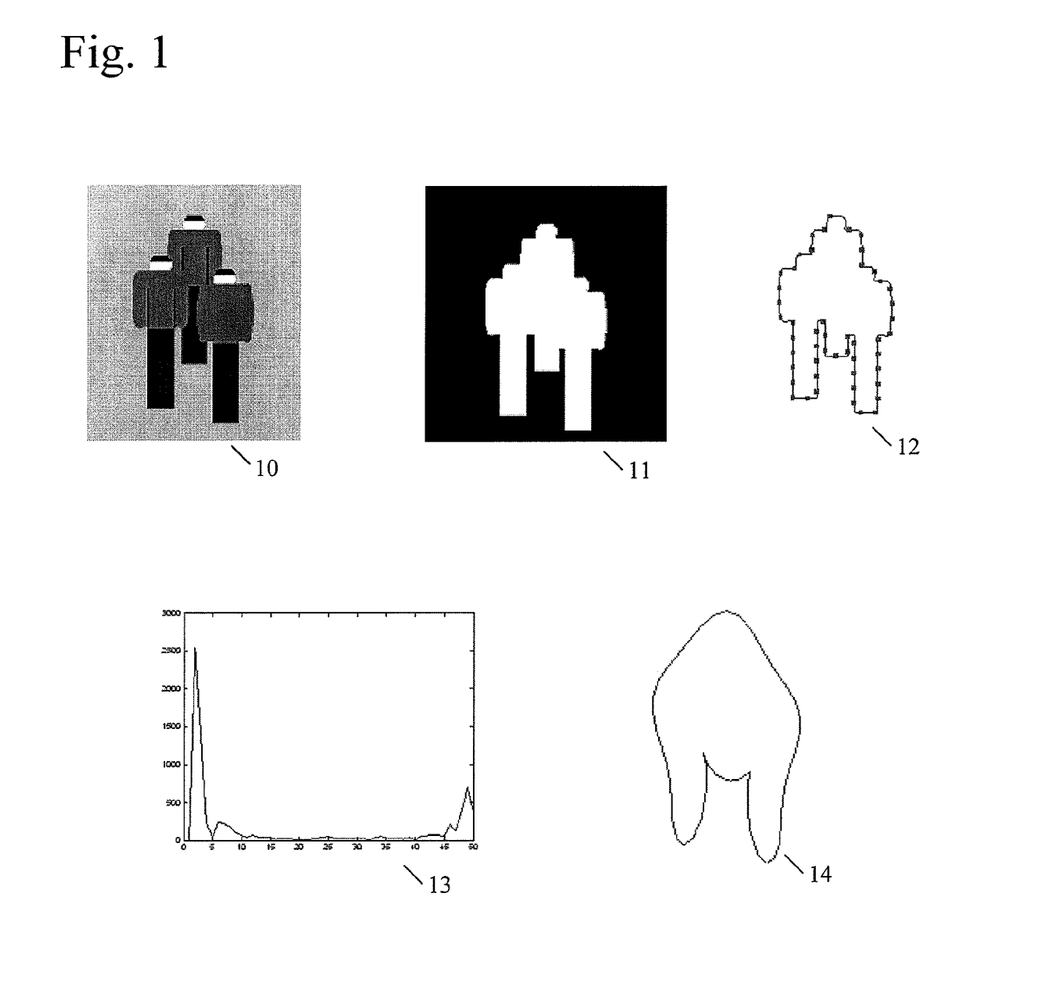
FIG. 1 is a set of pictures illustrating the representation of image data into Fourier descriptors according to an exemplary embodiment of the present invention.
Figure 2:
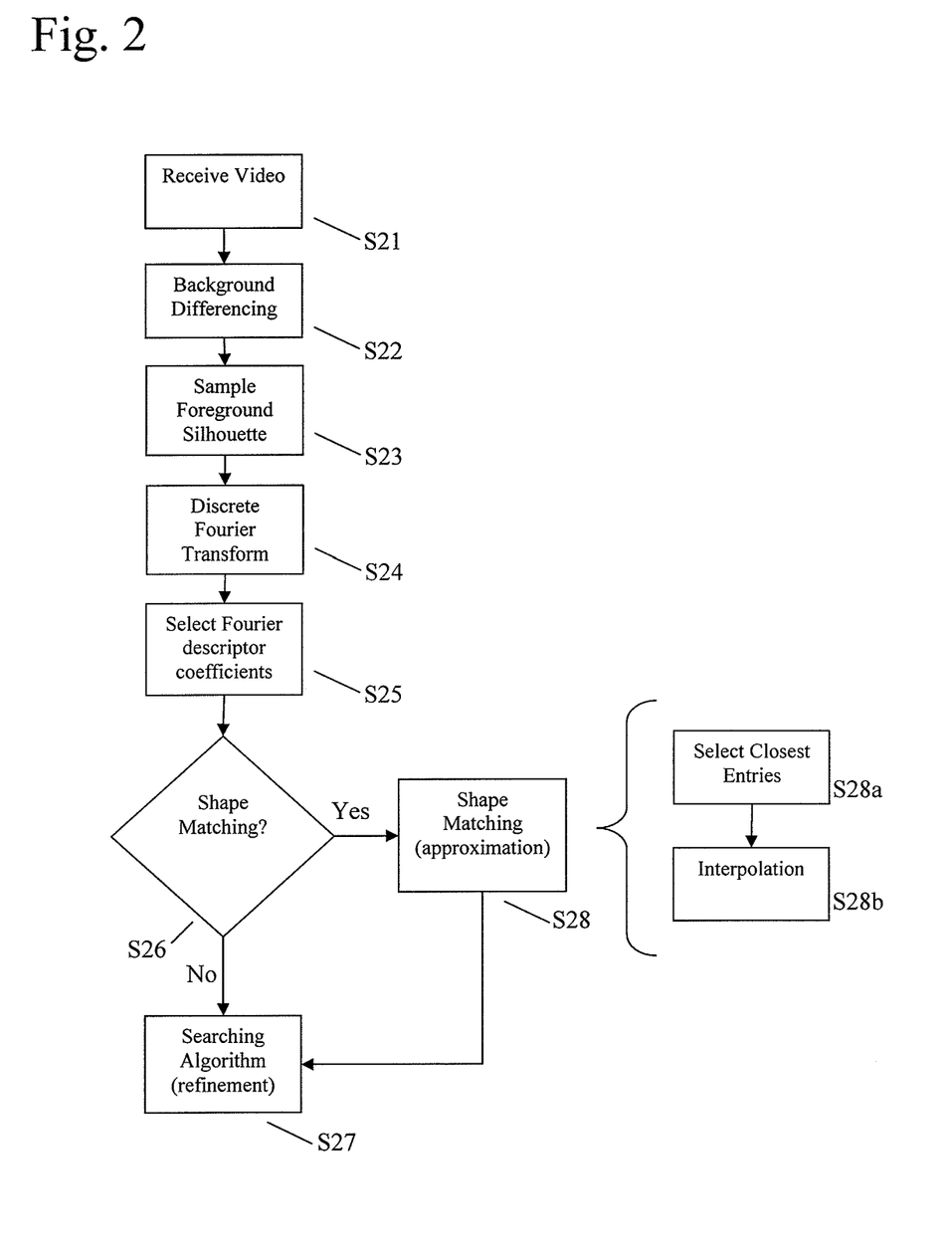
FIG. 2 is a flow chart illustrating a method for representing the image data as Fourier descriptors according to an exemplary embodiment of the present invention.

FIG. 1 is a set of pictures illustrating the representation of image data into Fourier descriptors according to an exemplary embodiment of the present invention. FIG. 2 is a flow chart illustrating a method for representing the image data as Fourier descriptors according to an exemplary embodiment of the present invention. The initial image data 10 may be captured (Step S21), for example, using a stationary digital video camera. Then, background differencing may transform the initial image data 10 into a silhouette shape 11 (Step S22). Next, the silhouette may be sampled using a fixed number of points along the external boundary of the shape (Step S23) to produce a sampling of boundary points 12. The sampled points may then be transformed into the frequency domain using a discrete Fourier transform (DFT) (Step S24) to produce a set of Fourier descriptor coefficients that represent the image. Then desired Fourier descriptor coefficients may be selected to be used as a shape signature (Step S25), for example, as described in detail below. Chart 13 is an illustration of the magnitude of the Fourier descriptors that represent the image. To illustrate the ability of the Fourier descriptors to characterize the image, object 14 is a shape reconstructed from the Fourier descriptors of chart 13. As can be seen from object 14, the Fourier descriptors accurately approximate the silhouette shape 11.

After the shape signature has been generated, it may be determined whether crowd segmentation may be performed on the shape signature by shape matching (Step S26). If it is determined that the shape signature is too complex to be segmented using shape matching (No, Step S26) then crowd segmentation may be performed using a searching algorithm (Step S27). If, however, it is determined that the same signature can be segmented using shape matching (Yes, Step S26) then crowd segmentation may be performed using shape matching (Step S28). Shape matching, as described in detail below, may include looking up the shape signature against a look-up table of previously analyzed shape signatures with known number and position of humans. Thus, shape matching may include selecting a set of closest matching entries from the look-up table (Step S28a) where each closest matching entry indicates the same number of humans but has a slightly different location organization and interpolating between the location organizations of the closest matches to find the approximate location of the humans found within the shape signature (Step S28b).

After shape matching is performed and an approximate number and location of the humans within the shape signature is determined (Step S28), crowd segmentation may be performed using the searching algorithm to refine the approximate results of step S27 to determine a final number and position of the human subjects.

The coefficients of the Fourier descriptor (FD) coefficients may be modified to facilitate using the Fourier descriptors to characterize the image data in terms of the number and location of the human subjects. For example, the first coefficient may be set to 0 to achieve position invariance. It is not necessary to seek rotation invariance because it may be assumed that the human subjects are upright. Inclusion of rotation invariance may result in some information loss and accordingly, exemplary embodiments of the present invention may achieve position invariance but might forego rotation invariance.

The FD coefficients of low frequencies contain information pertaining to the general characteristics of the shape and the FD coefficients of high frequency contain information on finer details. Also, the coefficients at high frequency are much smaller in magnitude than the coefficients at low frequencies. Accordingly, exemplary embodiments of the present invention may use only the coefficients at low frequency as shape signatures. By using only the FD coefficients at low frequencies, robustness to fine local variations may be achieved and, at the same time, similarity searching may be sped up.

In object 14, the shape is reconstructed using only the first and last seven FD coefficients. That is to say, at step S25, only the first and last seven FC coefficients are selected to comprise the shape signature. Here the DFT ranges from 0 to $2\pi$, and so the first and last seven coefficients, corresponding to low frequencies, are correlated. The number of coefficients used may be significantly less than the number of sample points on the boundary. Given two shapes with Fourier Descriptors $F_1$ and $F_2$, the Euclidean distance may be used as a similarity measure between the two shapes:

$$d_x = \sqrt{\sum_j \|F_1^{(j)} - F_2^{(j)}\|^2} \quad (1)$$

Here, $d_x$ is the distance between two shapes being matched, in feature space x, and may be used as a similarity measure in matching the shape signature against a set of previously characterized shape signatures.

Given a parameter set $\theta$, and keeping the number of people n fixed, the image feature F may be expected to change infinitesimally as the locations of the people vary or as the people articulate. Thus, the training process may sample points in the two spaces while the testing process results in a "query point" in the image feature space. The query point will typically not coincide with a sample point but may be close to several sample points (assuming sampling is sufficiently dense). Interpolation among the neighbors of the query points may be used to help identify a closest match.

The closest match may be returned as the initialization point of a search based strategy. This change alone may be used to speed up crowd segmentation approaches of the art. Nevertheless, motivated by the need for real time operation, the need for searching using local regression may be eliminated or postponed according to exemplary embodiments of the present invention. The classic K nearest neighbors technique (K-NN) may be used to take the sample mean among the closest K sample points and may be consistent and may achieve Bayes-optimal risk for many loss functions $$\hat{\theta}_{NM} = \frac{1}{K} \sum_{x_i \in K-NM} \theta_i \quad (2)$$

Here, K=1 takes the closest sample point. K-NN may be extended to achieve locally-weighted regression (LWR), where each sample point is given a weight. This approach may be used to fit a local function to the neighborhood around the query point and evaluate the function at the query point. The function can be fit using weighted least squares, giving more weight to sample points near the query point and less weight to those farther away. The local approximating function can be chosen from a particular class $g(x; \beta)$ which may be a low-order polynomial, often of degree one or even zero (higher degrees may be prone to over-fitting). The parameters $\beta$ may be chosen to minimize the weighted square errors in the test input $x_0$:

$$\beta^* = \operatorname*{argmin}_{\beta} \sum_{x_i \in K-NM} (g(X_i; \beta) - \theta_i)^2 \kappa(d_x(x_i, x_0)) \quad (3)$$

where $\kappa$ is a kernel function that assigns lower weight to larger distances from the query point. For low-order polynomial functions $g(x; \beta)$, a closed form solution for $\beta^*$ may be obtained by taking derivatives. The parameter set at the query point may then be given by:

$$\theta_0 = g(x_0; \beta^*) \quad (4)$$

Figure 3:
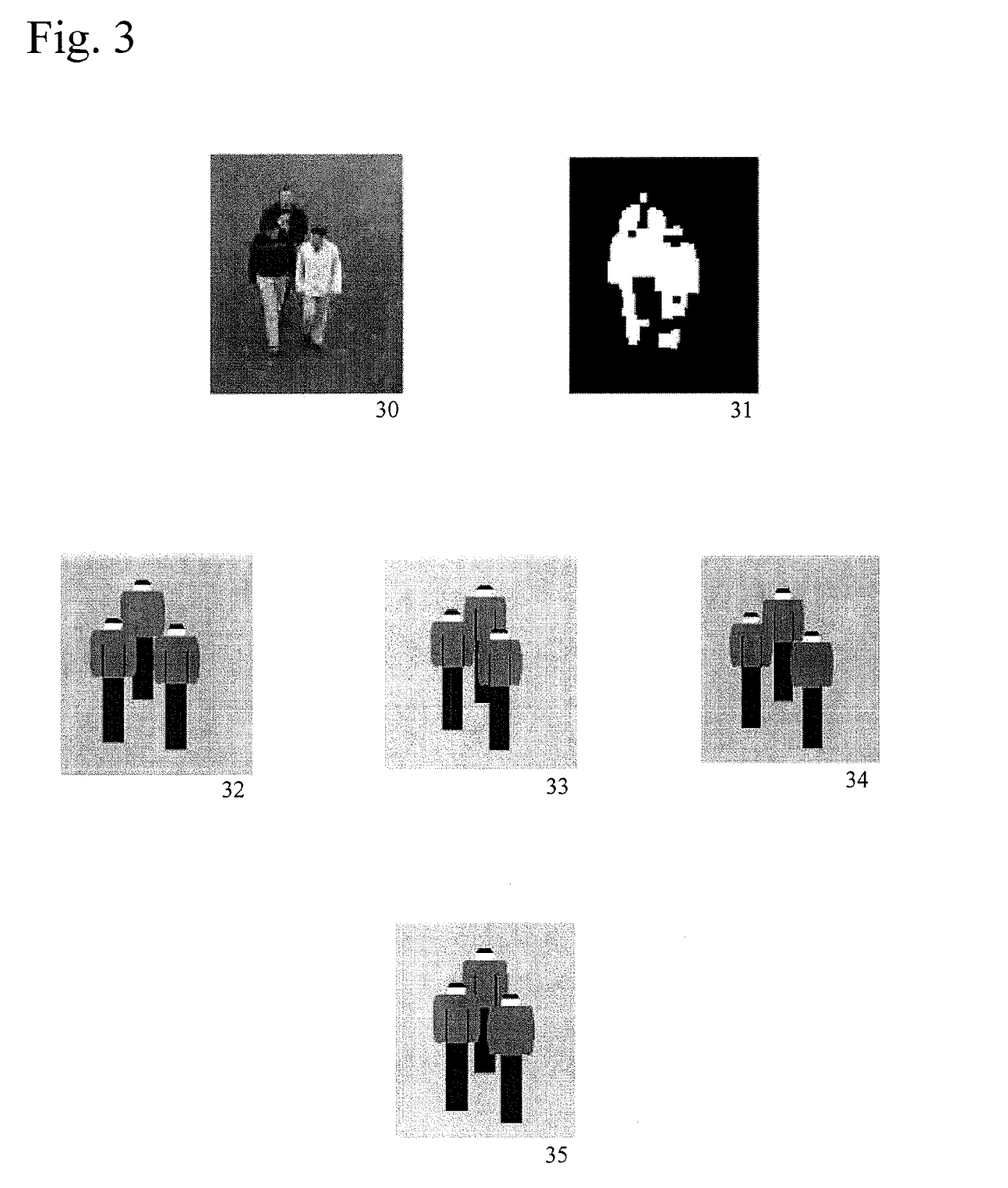
FIG. 3 is a set of pictures illustrating example-based matching according to an exemplary embodiment of the present invention.

Accordingly, the number of humans and their locations within the image data may be interpolated by comparison to a set of best matches. FIG. 3 is a set of pictures illustrating example-based matching according to an exemplary embodiment of the present invention. Here, picture 30 is the original image data. Picture 31 is the silhouette shape. Pictures 32, 33 and 34 represent the top three matched examples that may be found by comparing the determined shape signature (of Step 25) against a set of predetermined shape signatures representing a configuration of people of known numbers and position. After the top matches have been found, interpolation may be used to better characterize the number of people and their positions within the actual image. This may be performed, for example, using the techniques discussed above. Picture 35 represents the interpolation of the top matches.

Either classic LWR, or a variation thereof, may be used to interpolate for the best location of the humans in the blob assuming a correct n. An approach for estimating the number of people within the image (n) is discussed in greater detail below.

Existing background differencing techniques may not accurately accommodate camouflage that may result from a close match between a color of the foreground and a color of the background. Accordingly, these weaknesses in background differencing may result in gaps, holes, irregular boundaries and shape distortions. These gaps may be seen from the silhouette image 31 of FIG. 3. Here, parts of the bodies that comprise the silhouette image blob are missing and are disconnected. Because these gaps may result in reduced matching accuracy, a filtering step may be performed on the background differenced silhouette image blob.

Figure 4:
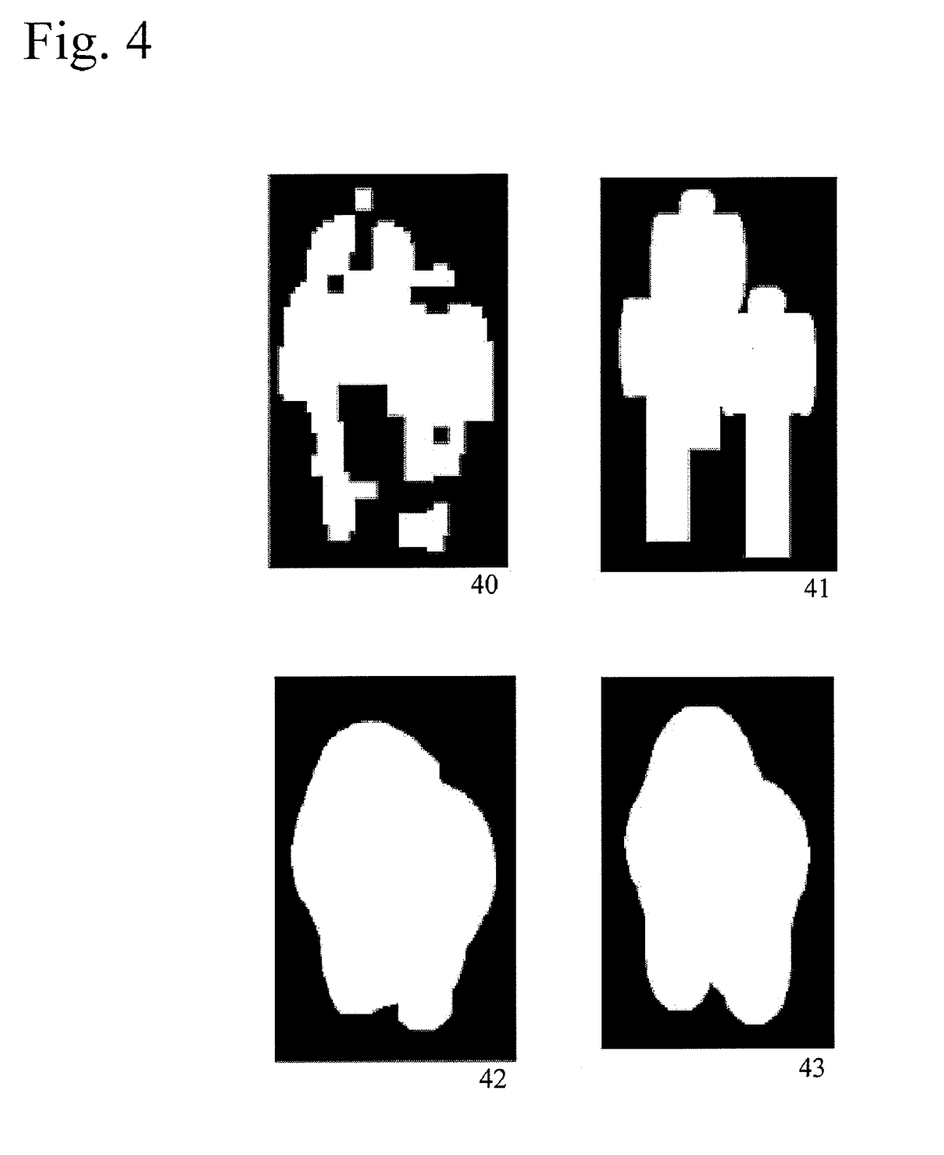
FIG. 4 is a set of pictures illustrating the effects of image filtering on background differenced silhouette images according to an exemplary embodiment of the present invention.

FIG. 4 is a set of pictures illustrating the effects of image filtering on background differenced silhouette images according to an exemplary embodiment of the present invention. While low pass filtering via Fourier descriptors eliminates finer distortions, morphological filtering using a rectangular structuring element may be applied over the foreground image to reduce the impact of blob fragmentation and articulation. Picture 40 represents an actual background differenced silhouette image prior to filtering. Picture 41 illustrates a simulated background differenced silhouette image prior to filtration. Picture 42 is a representation of the actual background differenced silhouette of picture 40, after filtering is performed according to an exemplary embodiment of the present invention. Similarly, picture 43 is a representation of the simulated background differenced silhouette of picture 41, after filtering is performed according to an exemplary embodiment of the present invention.

The filtering process helps connect fragmented blobs and forms a better external boundary, making the filtered shape of picture 42 and the filtered shape of picture 43 very similar. Accordingly, it may be easily observed how the filtering step assists in image matching.

Figure 5:
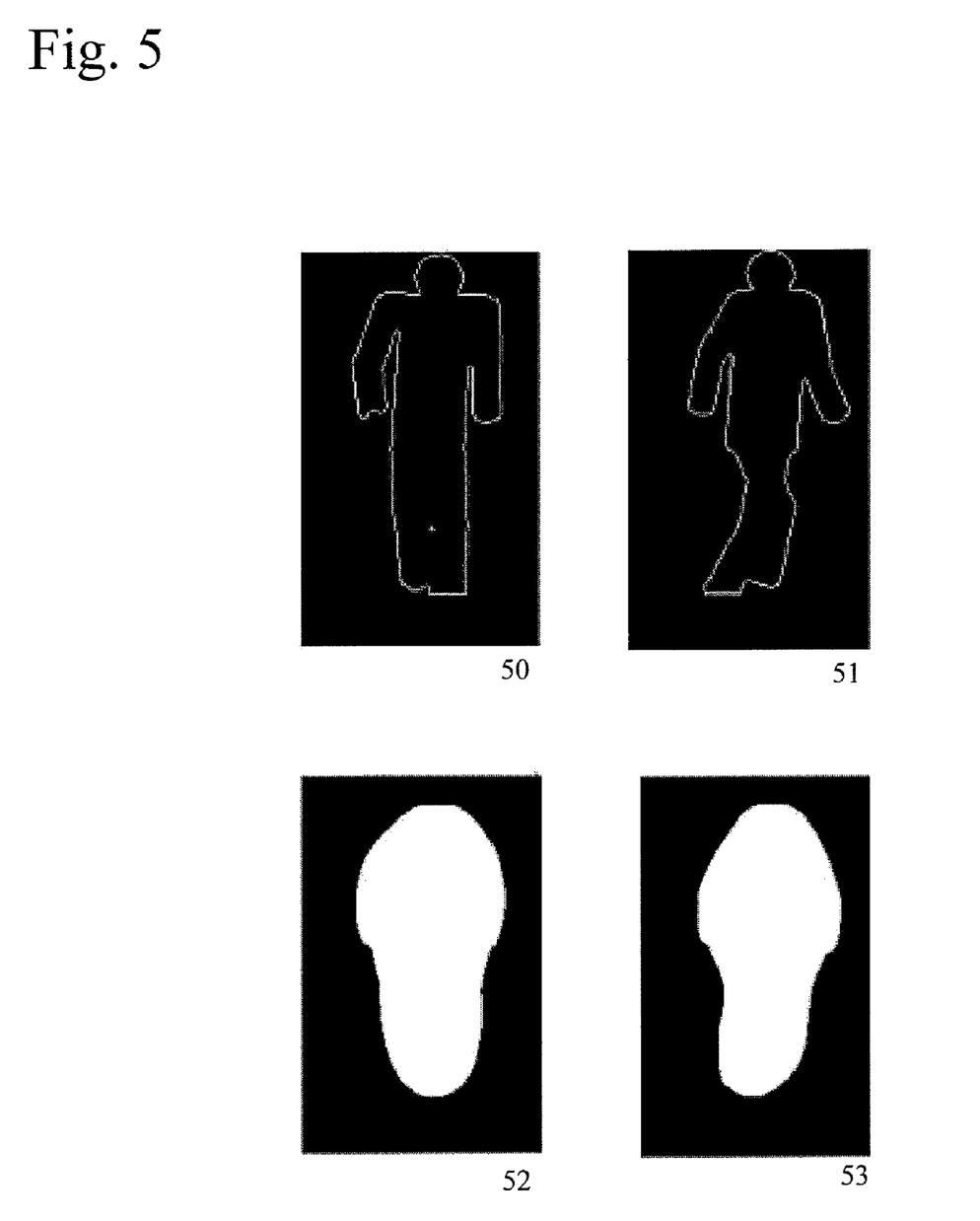
FIG. 5 is a set of pictures illustrating a pose-invariant filtering technique according to an exemplary embodiment of the present invention.

Moreover, filtering helps provide for pose invariance so that the position and location of each person may be easily determined without regard to the pose of each human subject. FIG. 5 is a set of pictures illustrating a pose-invariant filtering technique according to an exemplary embodiment of the present invention. Picture 50 is a view of a person in a first pose and picture 51 is a view of the person in a second pose. Picture 52 is the filtered version of picture 50 and picture 53 is the filtered version of picture 51. Because the filtered pictures 52 and 53 appear to be substantially similar, it can be observed that filtering provides pose-invariance.

As discussed above, it may be difficult to accurately determine the number of human subjects n found within the image data. This is in part because for certain configurations, consisting of a given number of people (e.g. three or more), it is possible to insert another person into the mix and end up with the exact same foreground blob. Hence, while the mapping process can disambiguate between some configurations there may be a significant number of configurations where the top match will be incorrect. Nevertheless, if all of the examples which are within a small distance to the query point are considered, the correct configuration is highly likely to have presented. This may be demonstrated from Table 1, below. This table shows the confusion matrix for random configurations of 1 to 6 overlapping people with random articulations where the configuration with the smallest Euclidean distance to the examples is considered to be the final answer. While there is confusion between some "neighboring" number of people such as between 3 and 4 people and between 5 and 6 people, the correct number of people may generally be found within a given distance to the query point, the distance calculable by simulation (see, for example, Table 2).

Exemplary embodiments of the present invention base disambiguation on the use of temporal coherence. By observing that as people move about in the blob, their number will not change, the correct number of human subjects n may be determined. This approach may use dynamic programming. The matched neighboring examples may first be clustered by different n. For each n, LWR may be used, for example as described above, to interpolate the locations of the people from the first k best matches (or less if there are fewer than k matches) corresponding to the same n. The n value, together with the locations is represented as a node (state) $\theta$ in a dynamic programming formulation.

Now the most likely path through a graph of these nodes over time may be found, where the likelihood of any path is the product of the transition probabilities along the path and the probabilities of the given observations at each state. For each time t, the probability $p(\theta_1, \ldots, \theta_t | x_{1:t})$ may be maximized, where $x_t$ is the observation at time t, namely, the observed foreground blob. Assuming the process is Markovian, the most likely path may be found by following dynamic programming recurrence:

$$\max_{\theta_1, \ldots, \theta_t} p(\theta_i, \ldots, \theta_t, \theta_{t+1} | x_{1:t+1}) \propto \qquad (5)$$

$$p(x_{t+1} | \theta_{t+1}) \times \max_{\theta_t} \left[ p(\theta_{t+1} | \theta_t) \max_{\theta_1, \ldots, \theta_{t-1}} p(\theta_1, \ldots, \theta_t | x_{1:t}) \right]$$

Here, expressions for the observation and transition probabilities and the recursion for the best parameter set are defined. The observation model may be stationary and does not depend on time. Therefore, the subscript t may be omitted for the observation probability $p(x|\theta)$. For the observation model it is reasonable to characterize the multi-human joint likelihood as shown:

$$p(x | \theta) \propto \left( \prod_{i=1}^{n} e^{-\lambda_1 A_i} (1 - e^{-\lambda_2 A_i}) \right) e^{-(\lambda_{10} N_{10} + \lambda_{01} N_{01})} \qquad (6)$$

where $A_i$ is image size and $N_{01}$ is the number of pixels in the blob absent in the hypothesis and $N_{10}$ is the number of pixels in hypothesis absent in the blob. The transition probability may be defined as:

$$p(\theta_t = n_1 | \theta_{t-1} = n_2) = \begin{cases} 1 - \varepsilon & \text{if } n_1 = n_2 \\ \varepsilon & \text{if } n_1 \neq n_2 \end{cases} \qquad (7)$$

Accordingly, a change in the number of people may be penalized, given that the blob remains spatially connected. The total number of states at each time is small. For example, there may be at most 6 states, but usually between 2 to 3 states so that the computation load is small.

Indexing Using Look-up Tables

Figure 6:
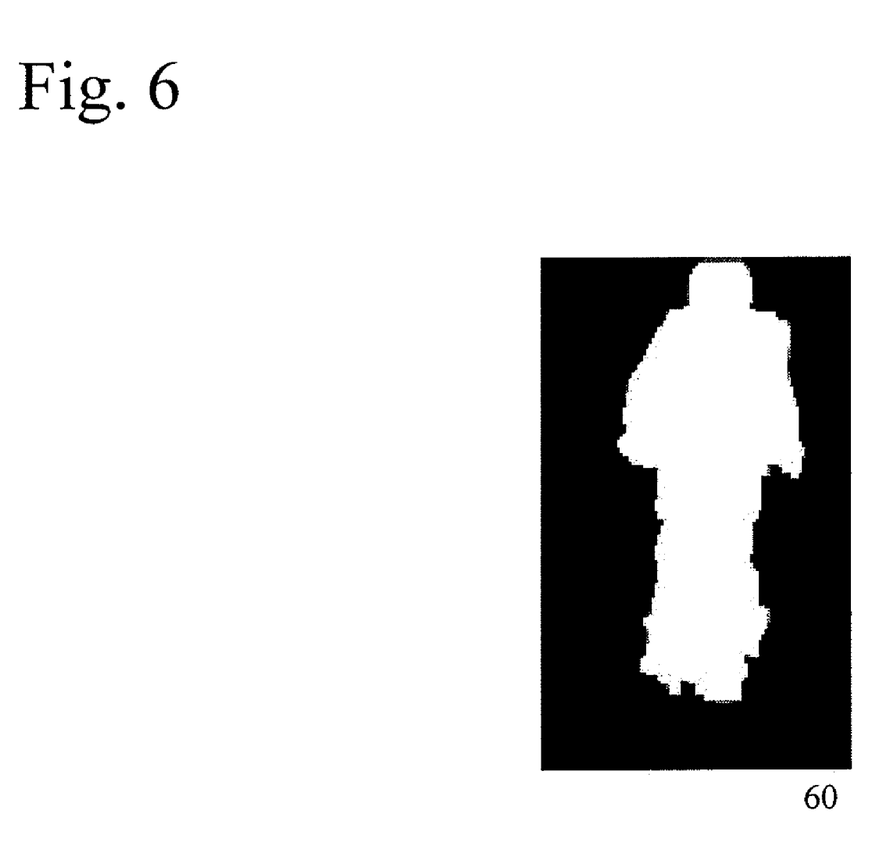
FIG. 6 is a picture of an average human shape that may be used according to an exemplary embodiment of the present invention.

As discussed above, motion capture may be obtained from walking humans and the obtained images may be rendered using a simple body model. An "average" shape of the different poses may be used for training. FIG. 6 illustrates a picture 60 of an average human shape that may be used according to an exemplary embodiment of the present invention. Exemplary embodiments of the present invention may not be interested in determining the pose of bodies in a foreground blob and such their articulation effects may be mitigated via spatial filtering. This reduces the size and time required to build the lookup table. The shapes used as training data may not have a significant impact on the results. An ellipse may even be used as the "average" shape of a person. The "average" image may be scaled to a canonical 120×200 pixels and adjusted for perspective with respect to its relative position in the blob. Different random positions and numbers of people may be analyzed such that a connected blob is formed. Fourier descriptors may then be calculated for the parameter set and the mapping may be stored. For example, there may be 80, 400, 2000, 10000 and 50000 samples for n=2, 3, 4, 5 and 6 respectively. For example, 64 sample points may be sampled on the boundary and 7 Fourier coefficients may be chosen for the representation. The structuring element for morphological filtering may be a rectangle, for example, of size 45×60. The number of human subjects n may be limited, for example to 6, based on the observation that for moderate crowd densities there are usually no more than 6 people in a single connected blob. There need not be any such limit to the total number of people within the entire scene.

TABLE I

Confusion matrix for top matches, 200 tests for each n

| n\n̂ | 1 | 2 | 3 | 4 | 5 | 6 | Detected |
|---|---|---|---|---|---|---|---|
| n = 1 | 200 | 0 | 0 | 0 | 0 | 0 | 100% |
| n = 2 | 0 | 148 | 50 | 2 | 0 | 0 | 74% |
| n = 3 | 0 | 11 | 85 | 94 | 9 | 1 | 42.5% |
| n = 4 | 0 | 0 | 8 | 82 | 64 | 46 | 41.0% |
| n = 5 | 0 | 0 | 0 | 14 | 72 | 114 | 36.0% |
| n = 6 | 0 | 0 | 0 | 1 | 27 | 172 | 86% |

TABLE 2

Confusion matrix for neighbors within
a distance 800, 200 tests for each n

| n\n̂' | 1 | 2 | 3 | 4 | 5 | 6 | Detected |
|---|---|---|---|---|---|---|---|
| n = 1 | 200 | 0 | 0 | 0 | 0 | 0 | 100% |
| n = 2 | 0 | 200 | 0 | 0 | 0 | 0 | 100% |
| n = 3 | 0 | 1 | 198 | 1 | 0 | 0 | 99% |
| n = 4 | 0 | 0 | 0 | 197 | 1 | 2 | 98.5% |
| n = 5 | 0 | 0 | 0 | 0 | 197 | 3 | 98.5% |
| n = 6 | 0 | 0 | 0 | 0 | 1 | 199 | 99.5% |

Table 1, above, shows the confusion matrix using a naive lookup where the parameter set with smallest $d_x$ represents a query blob (from 1200 random examples). The row corresponds to the true number of people in the input and the column corresponds to the estimate. Poor performance may be indicative of the inherent ambiguity in the mapping process. As long as the correct answer is among the top k returns, it can be filtered out through dynamic programming and LWR, as discussed above. Rather than a fixed k, for a Fourier threshold of 800, the correct number of humans n may be found in a set over 98% of the time (see table 2).

There may be a fundamental limit to the number of people that can be represented in accordance with an indexing approach. For n within the training set, indexing may be applied for fast crowd segmentation but for larger n, a more complex searching algorithm may be used. The approach may be able to self-diagnose to ensure that it is operating within range. This may be accomplished, for example, by using the probability density of the normalized blob area (accounting for perspective) to classify the blob as out-of-range. This probability distribution may be estimated via simulation. The threshold T may be calculated as follows:

$$\int_{-\infty}^{T} p(f \mid n = m) \, df = 1 - r \, \% \tag{8}$$

where p(f|n) is the probability density function of the normalized blob area given n people, m is the limit and r % is the detection rate required. Blobs that have a normalized area more than T may be diagnosed as being out of range. The purpose of this determination is to find situations where this approach cannot be applied. Where it is determined that this approach cannot be applied, the task of determining the number and position of human subjects within the image may be handed off, for example, to a search-based algorithm.

In performing exemplary embodiments of the present invention, first a Stauffer-Grimson based algorithm may be applied to the received image data for the detection of change in the video sequence. Change detection may yield connected foreground blobs in each frame. Where it is only desired that complete blobs are processed, incomplete blobs may be discarded. Incomplete blobs may be defined as those blobs that touch the image borders. Frame-to-frame blob correspondence may then be established via matching blobs based on their proximity and similarity in area. The blobs may be scaled for perspective and filtered using the morphological operation, for example as described above. Then the blobs may be indexed based on their Fourier descriptors followed by LWR and dynamic programming to output the parameter set that best explained the shape and evolution of the blobs. Table 3 below shows the confusion matrix on the number of people (row corresponding to the ground truth and column to the estimate).

TABLE 3

Confusion matrix for real image sequence

| n\n̂' | 0 | 1 | 2 | 3 | 4 | 5 | total |
|---|---|---|---|---|---|---|---|
| n = 1 | 50 | 1275 | 10 | 0 | 0 | 0 | 1875 |
| n = 2 | 0 | 65 | 299 | 2 | 0 | 0 | 366 |
| n = 3 | 0 | 0 | 49 | 67 | 0 | 0 | 116 |
| n = 4 | 0 | 0 | 0 | 4 | 57 | 0 | 61 |
| n = 5 | 0 | 0 | 0 | 0 | 11 | 7 | 18 |
| n = 6 | 0 | 0 | 0 | 0 | 0 | 0 | 0 |

TABLE 4

Distance error for n = 2, 3, 4, 5

| | n = 2 | n = 3 | n = 4 | n = 5 |
|---|---|---|---|---|
| LWR | 0.1351 | 0.1873 | 0.1900 | 0.2088 |

Another pertinent metric is the accuracy of the location estimates of the detected humans. Here "distance error" $\epsilon_d$, the average normalized Euclidean distance between the relative position parameters of ground truth and the estimate may be calculated:

$$\varepsilon_d = \frac{1}{N} \sum_{i=1}^{N} \sqrt{\left(\frac{x_{i,est} - x_{i,act}}{W_i}\right)^2 + \left(\frac{y_{i,est} - y_{i,act}}{H_i}\right)^2} \tag{9}$$

Figure 7:
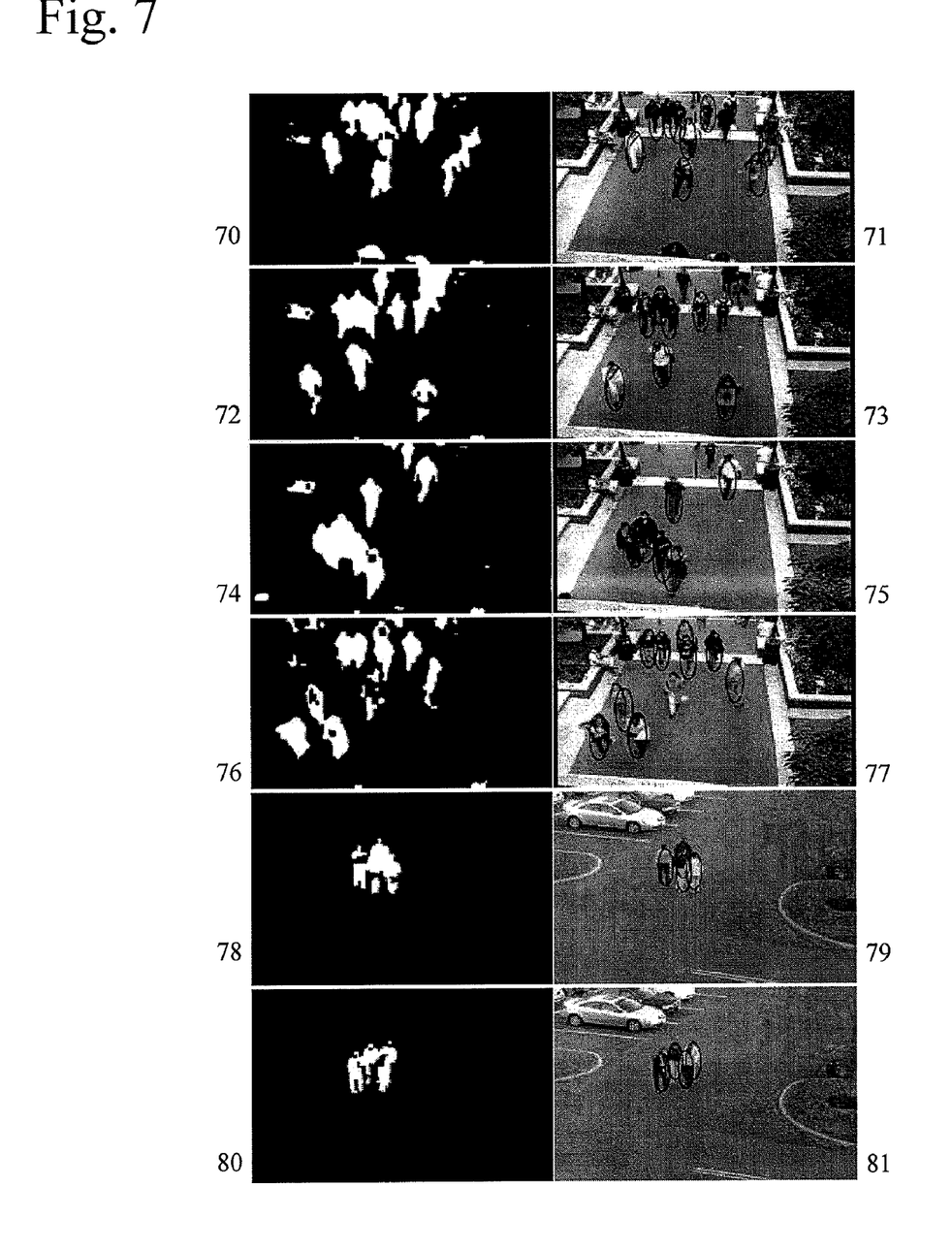
FIG. 7 is a set of pictures illustrating several examples of crowd segmentation according to an exemplary embodiment of the present invention.

Here, N is the total number of people. The subscript est represents the estimate and act represents actual. W denotes the width of the human in the scene and H denotes the height. Table 4 above shows the average distance error for a locally constant fitting function. FIG. 7 is a set of pictures illustrating several examples of crowd segmentation according to an exemplary embodiment of the present invention. Here, the set of pictures show frames where people are clustered together in various configurations with significant occlusions and articulations. Pictures 70, 72, 74, 76, 78, and 80 show the foreground blobs that are produced in accordance with the above-described approaches, while pictures 71, 73, 75, 77, 79 and 81 show the corresponding images with identified people being marked with an oval shape. It can be seen from these results that the methods described above may be highly accurate.

The overall detection rate may be reasonably high, for example, it may be 94.25% accurate. The run time speed for this approach may also be quick and may take, for example, less than 0.04 seconds of CPU time running unoptimized C++ code on a Pentium IV 2.8 G Hz PC. 4.3.

A MCMC based search algorithm may be aided by a fast indexing method as described above. In the MCMC algorithm may provide for human hypothesis addition/removal, model and hypothesis switching, and diffusion. One approach to speed up the search is to index from shape to a parameter-set based on the best match, for example, as described above. After indexing has been performed, the MCMC search may be performed. The indexing may reduce the number of iterations from 2000 to 1473 on average on the parking lot image sequence discussed above.

Figure 8:
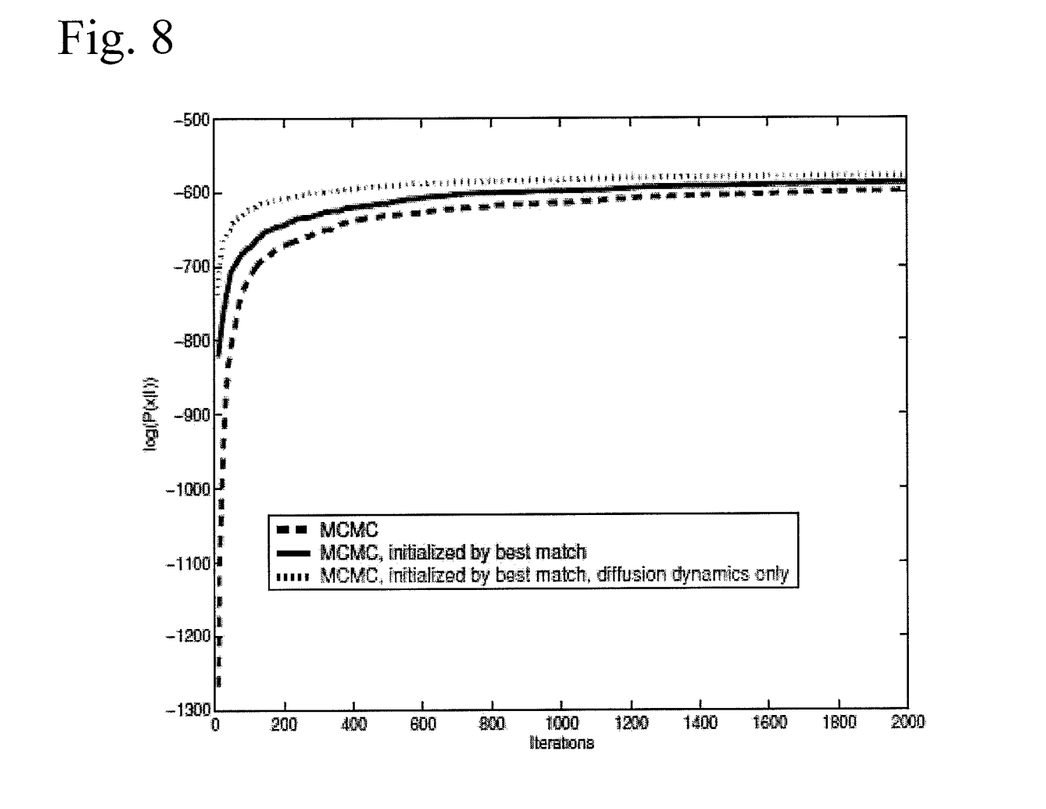
FIG. 8 is a graph showing the use of the search indexing approach as compared with the LWR approach according to an exemplary embodiment of the present invention.

Another approach is to use LWR and dynamic programming to determine n, followed by the use of diffusion in which the need for hypothesis addition/removal or switching may be eliminated. This approach may reduce the number of iterations required for convergence to 347. FIG. 8 is a graph showing the use of the search indexing approach as compared with the LWR approach according to an exemplary embodiment of the present invention. These two strategies may be performed in addition to the MCMC search algorithm. As can be seen from the graph, both the strategies may result in significant speed-up of the searching process.

Figure 9:
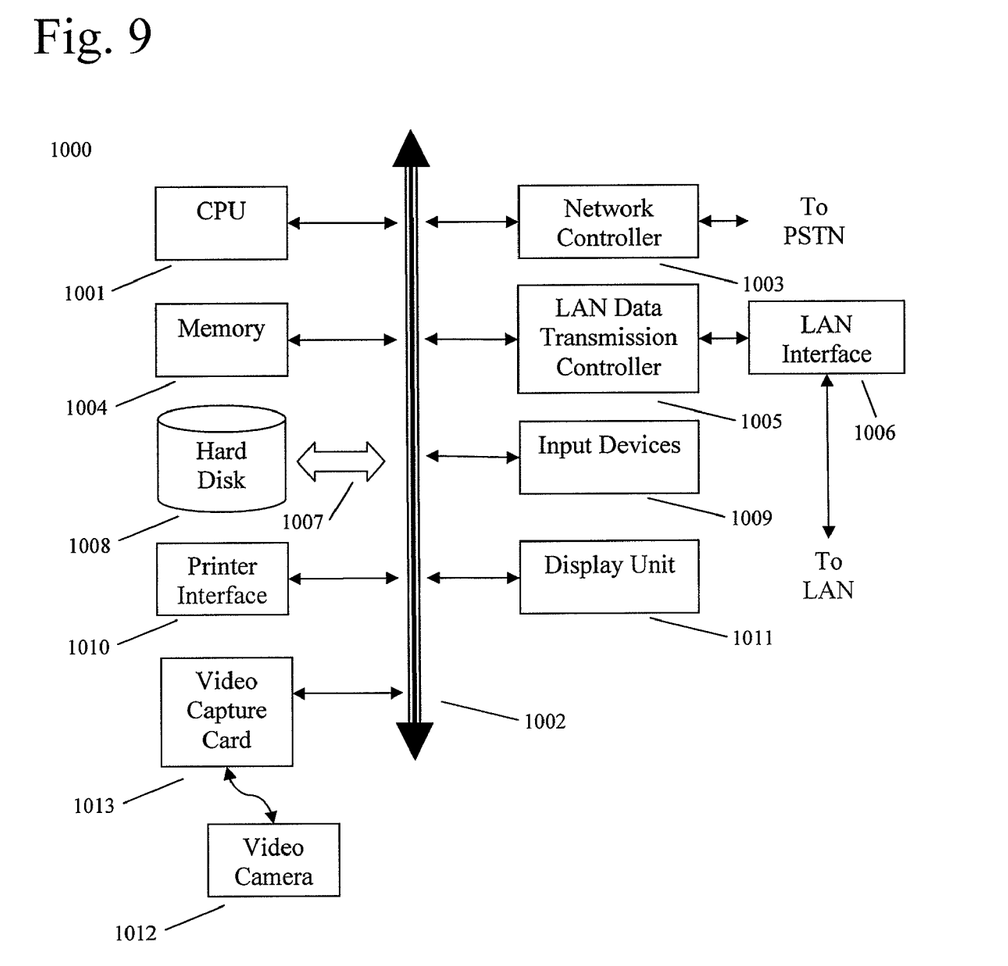
FIG. 9 shows an example of a computer system capable of implementing the method and apparatus according to embodiments of the present disclosure.

FIG. 9 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. A video camera 1012, for example, a stationary surveillance camera, may be connected to the computer system, for example, the internal bus 1002, either wirelessly or wired, via a video capture card 1013.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing crowd segmentation, comprising:
    receiving video image data;
    performing background differencing on the received video image data to identify a foreground silhouette shape;
    determining an approximate number of human subjects within the received video image data and determining an approximate position of each of the human subjects within the received video image by matching the foreground silhouette shape against a set of predetermined foreground silhouette shapes including predetermined foreground silhouette shapes for multiple overlapping human subjects, wherein for each of the predetermined foreground silhouette shapes, a number and position of human subjects is known; and
    refining the estimated number and position of the human subjects to determine a final number and position of the human subjects.

2. The method of claim 1, wherein determining the approximate number and position of human subjects within the received video image data includes:
    representing the foreground silhouette shape as a representative shape descriptor;
    matching the representative shape descriptor against a set of predetermined shape descriptors, for each of which a number and position of human subjects is known, to find at least one closest predetermined shape descriptors; and
    determining approximate number and position of human subjects within the received video image data based on the known number and position of human subjects from the one or more closest predetermined shape descriptors.

3. The method of claim 2, wherein representing the foreground silhouette shape as a representative shape descriptor includes creating an indexing function from the foreground silhouette shape and matching the representative shape descriptor includes looking up the indexing function in a pre-computed table that maps indices to the number and position of human subjects within the video image data.

4. The method of claim 2, wherein representing the foreground silhouette shape as a representative shape descriptor comprises:
    sampling the perimeter of the foreground silhouette shape to obtain a set of sample points;
    transforming the set of sample points into the frequency domain by performing a discrete Fourier transform;
    selecting a set of desired Fourier descriptor coefficients from the set of sample points in the frequency domain; and
    forming the shape descriptor based on the selected set of desired Fourier descriptor coefficients.

5. The method of claim 4, wherein the perimeter of the foreground silhouette shape is sampled at regular intervals.

6. The method of claim 4, wherein selecting the set of desired Fourier descriptor coefficients comprises selecting a set of low frequency Fourier descriptor coefficients.

7. The method of claim 4, wherein selecting the set of desired Fourier descriptor coefficients from the set of sample points in the frequency domain includes setting a first Fourier descriptor coefficient to zero to achieve position invariance.

8. The method of claim 2, wherein the representative shape descriptor is position invariant.

9. The method of claim 2, wherein matching the representative shape descriptor against the set of predetermined shape descriptors includes consulting a look-up table.

10. The method of claim 2, wherein determining approximate number and position of human subjects within the received video image data based on the known number and position of human subjects from the one or more closest predetermined shape descriptors includes interpolating the known number and position of human subjects from the one or more closest predetermined shape descriptors based on the relationship between the representative shape descriptor and the closest predetermined shape descriptors.

11. The method of claim 10 wherein the interpolation is carried out using Locally Weighted Regression.

12. The method of claim 1, wherein in refining the estimated number and position of the human subjects, the approximate number and position of human subjects within the received video image data is used as a starting point for generating the final number and position of the human subjects within the received video image data.

13. The method of claim 1, wherein refining the estimated number and position of the human subjects is performed using a computational search algorithm.

14. The method of claim 13, wherein the search algorithm is a Markov Chain Monte Carlo algorithm.

15. The method of claim 1, wherein the approximate number and position of human subjects within the received video image data is tracked from frame to frame within the video image data.

16. The method of claim 1, wherein background differencing is performed on the received video image data by applying a change detection algorithm to the received video image data.

17. The method of claim 1, wherein prior to matching the foreground silhouette shape, it is determined whether the foreground silhouette shape is amenable to shape matching-based crowd segmentation.

18. The method of claim 1, wherein the foreground silhouette shape is filtered prior to matching the foreground silhouette shape to increase matching accuracy.

19. The method of claim 1, wherein the steps of performing background differencing and determining an approximate number of human subjects and determining an approximate position of each of the human subjects is repeated multiple times for different frames of the received video image and refining the estimated number and position of the human subjects includes considering the number of human subjects approximated from each of the different frames while assuming that the number of actual human subjects does not change from frame to frame.

20. A method for performing crowd segmentation comprises:
  receiving video image data;
  performing background differencing on the received video image data to identify a foreground silhouettes shape;
  representing the foreground silhouettes shape as a representative shape descriptor;
  matching the representative shape descriptor against a set of predetermined shape descriptors including predetermined foreground silhouette shapes for multiple overlapping human subjects, wherein for each of the predetermined foreground silhouette shapes, a number and position of human subjects is known, to find at least one closest predetermined shape descriptors; and
  approximating a number of human subjects within the received video image data and approximating a position of each of the human subjects within the received video image based on the known number and position of human subjects from the one or more closest predetermined shape descriptors.

21. The method of claim 20, wherein the steps of performing background differencing and determining an approximate number of human subjects and determining an approximate position of each of the human subjects is repeated multiple times for different frames of the received video image and refining the estimated number and position of the human subjects includes considering the number of human subjects approximated from each of the different frames while assuming that the number of actual human subjects does not change from frame to frame.

22. A computer system comprising:
  a processor; and
  a program storage device readable by the computer system, embodying a program of instructions executable by the processor to perform method steps for performing crowd segmentation, the method comprising:
  receiving video image data;
  performing background differencing on the received video image data to identify a foreground silhouette shape; and
  determining an approximate number of human subjects within the received video image data and determining an approximate position of each of the human subjects within the received video image by matching the foreground silhouette shape against a set of predetermined foreground silhouette shapes including predetermined foreground silhouette shapes for multiple overlapping human subjects, wherein for each of the predetermined foreground silhouette shapes, a number and position of human subjects is known.

23. The computer system of claim 22, wherein the steps of performing background differencing and determining an approximate number of human subjects and determining an approximate position of each of the human subjects is repeated multiple times for different frames of the received video image and refining the estimated number and position of the human subjects includes considering the number of human subjects approximated from each of the different frames while assuming that the number of actual human subjects does not change from frame to frame.

* * * * *